July 25, 1961     A. W. NORDGREN     2,993,578

MOUNTING FOR FRICTION SEGMENTS IN BRAKE OR CLUTCH DEVICES

Original Filed June 25, 1957     2 Sheets-Sheet 1

INVENTOR.
ARNOLD W. NORDGREN.
BY John A. Young
ATTORNEY.

United States Patent Office 2,993,578
Patented July 25, 1961

2,993,578
MOUNTING FOR FRICTION SEGMENTS IN BRAKE OR CLUTCH DEVICES
Arnold W. Nordgren, South Bend, Ind., assignor to The Bendix Corporation, a corporation of Delaware
Continuation of application Ser. No. 667,820, June 25, 1957. This application Dec. 3, 1958, Ser. No. 778,025
13 Claims. (Cl. 192—107)

This invention relates to a mounting construction intended for use in attaching friction segments to a carrier member which forms a part of brake or clutch constructions. The mounting principles devised are for the purpose of eliminating or suppressing brake or clutch "chatter"; and the present application is a continuation of application Serial Number 667,820, filed June 25, 1957, now abandoned.

It has been found that "chattering" in brakes or clutches arises from a number of independent factors, and it has become possible to reliably detect and segregate the various factors involved in brake "chatter" so that various, specific corrective measures can be taken to eliminate the contributing causes. Evidence now indicates that "chatter" is traceable to (1) the friction properties and change in friction properties of the brake material; (2) the instability of the braking forces which are developed tangentially to the engageable members of the brake or clutch.

Brake or clutch "chatter" is mitigated and sometimes wholly corrected by making appropriate formulation changes in the friction composition; "chatter" is also correctiable from a construction standpoint by providing an appropriate mounting structure for the friction segment which will have a damping effect on the brake "chatter"; a combination of these two approaches is also possible.

The present invention was made responsively to the usage of metallic-ceramic friction materials in brake or clutch friction devices. One of the persistent problems accompanying the usage of metallic-ceramic friction materials is their tendency to support "chatter." Rather than solving the problem by making formulation changes in the composition (these changes oftentimes detract from other desirable properties of the lining), it is proposed that the present invention will correct for the "chatter" by suitable construction features involving the mounting of the friction segments.

It is, therefore, an object of the invention to eliminate or reduce "chatter" tendency in a clutch or brake device having a ceramic-metallic friction material, by providing a suitable damping arrangement incorporated into the mounting of the friction segment which will compensate for the instability of the friction material by lessening the tangential impact between the friction material and its engageable surface.

It is further proposed that with the damping incorporated into the mounting, there will be eliminated or substantially reduced audible "squeals" which result from torsional wind-up of the brake or clutch members.

Although the present invention will not reduce the "chatter" tendency of a given material (this is determined from the nature of the material itself), it can circumvent critical "chatter" conditions established by the friction material. Some of those conditions precipitating "chatter" relate to high orders of normal load between the friction surface and opposing surface, the force, frequency and variations of material during tangential impact between the engageable surfaces of lining and opposing surface and the various surface conditions of the friction lining which develop during the course of an engagement.

Other objects and features of the invention will become apparent from a consideration of the following description which proceeds with reference to the accompanying drawings, wherein.

Figure 2:
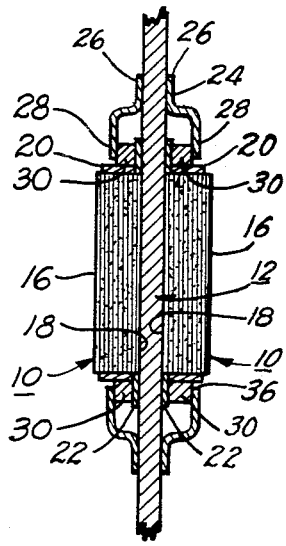
FIGURE 2 is a section view taken on line 2—2 of FIGURE 1.

Referring now to the drawings, a plurality of friction segments or friction producing members designated generally by reference numeral 10 are secured to an annular carrier or stator brake member 12 which is usable in either a disc brake or a clutch device. The friction segments are mounted at spaced intervals around the circumference of the carrier member 12. One example of a disc brake with which the present invention is usable is shown in U.S. Patent No. 2,784,105, issued March 5, 1957.

Figure 1:
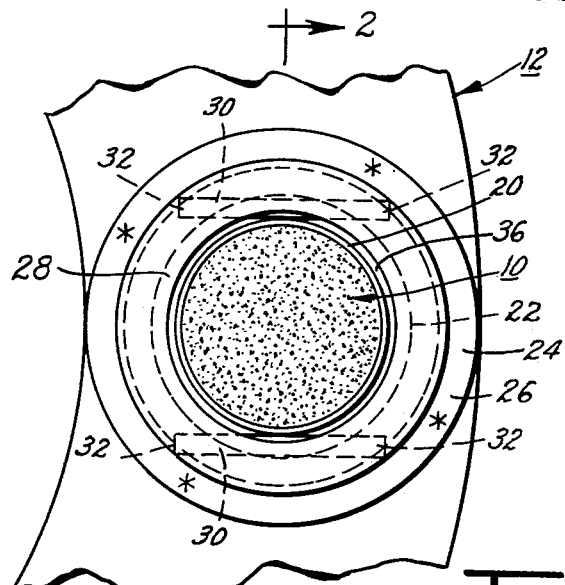
FIGURE 1 is an enlarged fragmentary view of one of the friction segments and mountings therefor.

As shown in FIGURE 1, the carrier 12 is one of the stator member, with a rotor brake member 13 being provided on either side thereof. There is a mounting structure for each friction segment which will next be described with particular reference to FIGURES 1 and 2.

The segment of friction material lining or friction producing member 10, which may be of any shape, such as circular, sector shaped, rectangular, etc., is mounted on opposite sides of the carrier or stator member 12. The segment has a working surface and an undersurface 18 which is in rubbing contact with the adjacent side of the carrier 12.

Surrounding each of the friction segments 10 is a reinforcing flange or annular ring 20 which laterally supports the friction material. An annular stamping 22 is secured to reinforcement 20 in any desired manner, e.g. by welding, brazing, or the like. Circumscribing each of the friction segments is a retainer or clip means or clamping ring 24 having a flat, circular outer portion 26 which lies against carrier plate 12 and is welded thereto, and an offset radially inner portion 28 which is spaced from the carrier 12 to overlie bar springs 30 which are held against annular stamping 22. By means of this arrangement, the friction segment is held laterally against the carrier 12.

The ends 32 of bar spring 30 are fitted into notches in the retainer 24. Referring to FIGURE 1, the springs 30 are arranged as chords of the circular retainer 24. The supporting flange 20 is displaced from the edge 36 of the overlying flange 28. This slight displacement permits movement of friction segment 10 relatively to carrier member 12. The limitations of this relative movement are fixed by edge 36 since the edge acts as a fixed abutment, preventing further movement of the friction segment once the supporting flange 20 comes into contact therewith. Referring to FIGURE 1, it will be seen that the surrounding reinforcing flange 20 is located to be concentric with edge 36 of the overlying flange 28, this location of the friction segment being obtained by means of the bar springs 30 which urge the flange 20 away from engagement with edge 36.

Figure 4:
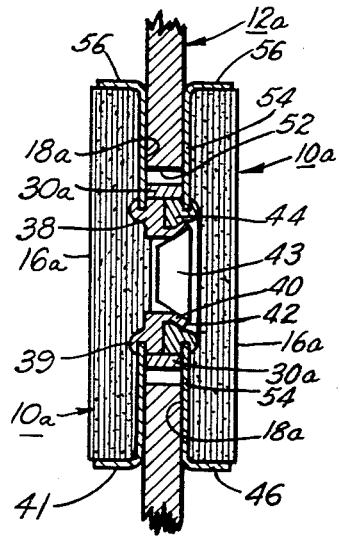
FIGURE 4 is a section view taken on line 4—4 of FIGURE 3.
Figure 3:
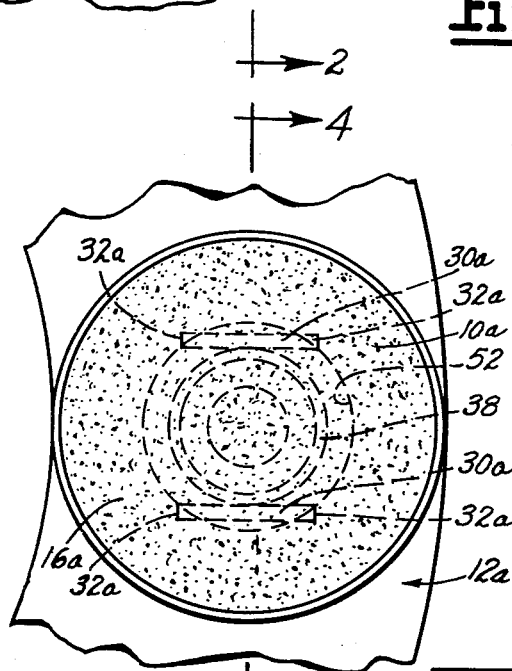
FIGURE 3 is an enlarged fragmentary view of a second mounting arrangment.
Figure 5:
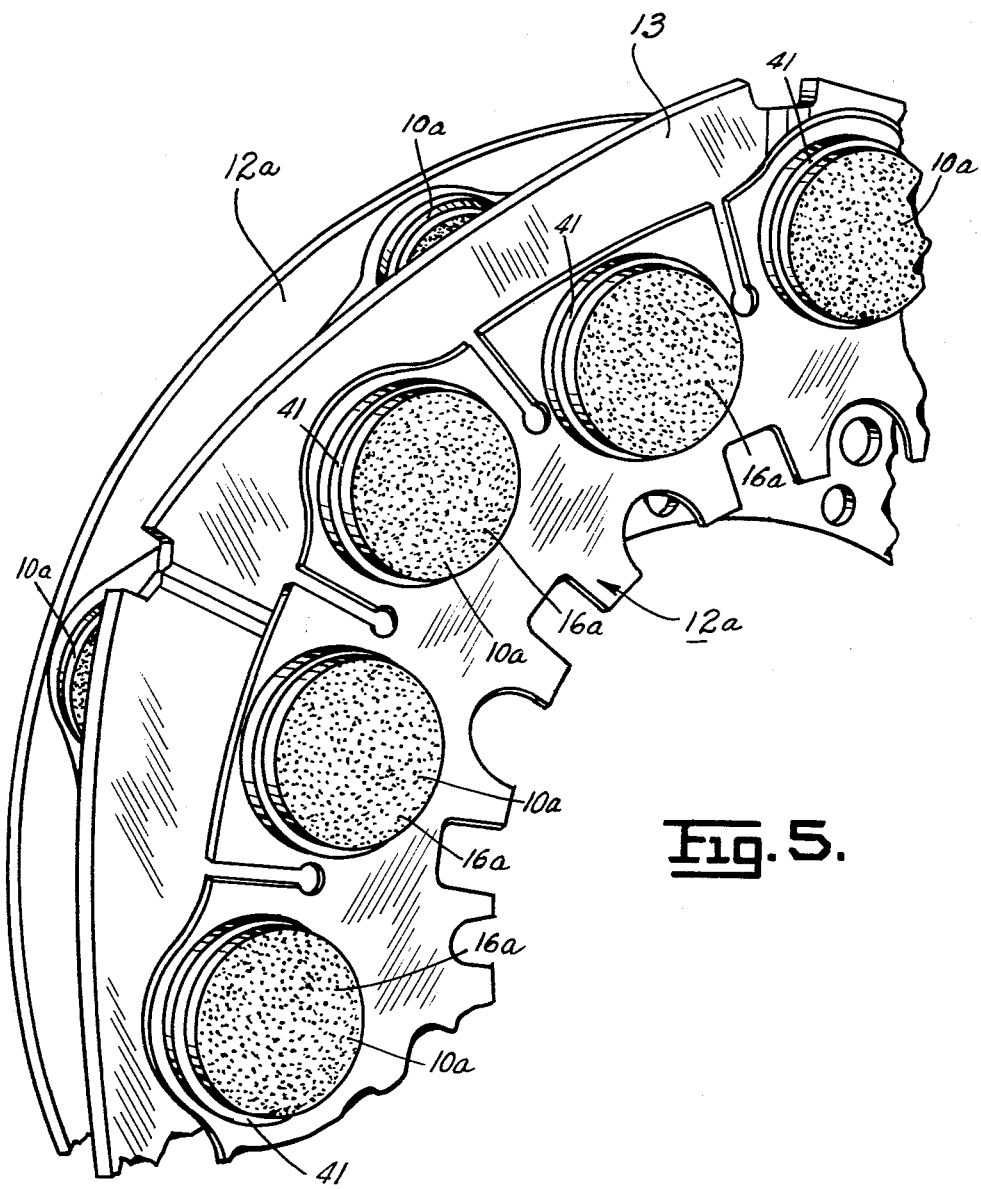
FIGURE 5 is a fragmentary isometric view of a pair of stator members having a number of friction segments mounted thereon and an interleaved rotor.

Referring to FIGURES 3 to 5, parts of the friction segment and mounting will be designated by the same reference numeral with a subscript "a" where they correspond with previously described parts.

Friction segments 10a are mounted back to back on opposite sides of carrier 12a. The friction segments are drawn together by means of a tubular rivet fastener 38 connected at one end 39 to container 41 and having an end 40 which is deformable by rivet button 43 to be brought into engagement with an inclined surface 42 of a clasp 44 which grips container 46. The deformable end 40 of the fastener is bent into engagement as described when the friction segments are pushed together. Further details of this fastening technique are disclosed in copending application Serial No. 257,282, filed November 20, 1951, now Patent No. 2,806,570, issued September 17, 1957.

When the fastening operation is completed, the undersurfaces 18a of containers 41 and 46 are engageable with opposite faces of the carrier 12a. The interconnecting fasteners for the two friction elements are located within an oversize opening 52 in the carrier 12a with two bar springs 30a fitted between the fastening and the sides of opening 52 so that the bar springs 30a are chords of the circular opening 52. The ends 32a of the spring are received in notches of the opening 52 to prevent turning of the springs. During braking, as the friction segments shift circumferentially on the carrier 12a in a forward direction, the fastener will deform the springs until braking torque causes the bar springs 30a to resist further displacement. Under extreme braking stresses, the bar springs 30a will conform with an arc of the opening 52 and thereafter, further movement of the friction elements relatively to the carrier is prevented.

When the brake or clutch operation is completed, the springs 30a return the friction segments to their original position.

The containers 41 and 46 each have a backing 54 and a laterally extending side 56 which lends lateral support to the friction material and prevent undue wear rate of the friction material. The undersurface 18a of the containers 41 and 46 is coated with a suitable lamination of friction material which provides the desired coefficient between the backing 54 and adjacent surface of the carrier 12a so that resistance to movement of the friction segment relatively to the carrier 12a can be made a matter of design preference.

Referring now to FIGURES 1 and 2, during operation of the brake or clutch, the carrier 12 which is interleaved between relatively rotatable first and second brake members, is clamped between the adjacent relatively rotatable members i.e. rotors and stators so that friction surfaces 16 are brought into rubbing contact with adjoining, relatively moving brake surfaces. Previously, it was the practice to provide a rigid mounting of the friction segment on the carrier 12 with no provision for floatable movement of the friction segments on the carrier 12. With the arrangement described, the rubbing contact between friction segments 10 and their opposing surfaces will tend to move the friction segment circumferentially in a forward direction against the resistance of springs 30 and against the frictional resistance encountered at surface 18 between the segment 10 and the adjoining surface of carrier 12. The resistance to floatable movement of the friction segment is proportional to the normal force of engagement between surfaces 16 and their opposing surfaces and to the coefficient of friction between the undersurfaces 18 of the friction segments and the adjoining surface of carrier 12.

If the brake should tend to "chatter," there occurs some relative forward and rearward movement between the friction segment and the carrier 12, this relative movement being limited by engagement of flange 20 with the edge 36 of overlying member 28. The net effect of this relative movement is to provide a damping effect on the "chatter" conditions, thus alleviating or minimizing the effects of "chatter" during brake or clutch operation.

It will be noted that floatable movement of the friction segment is provided in either circumferential direction. In the case of brake operation, "chatter" is prevented during either forward or reverse vehicle movement which produces a corresponding clockwise or counterclockwise rotation of the rotors which engage with the friction segments.

When the brake or clutch is released, disengaging friction surfaces 16 with the opposing surface, the bar springs 30 will disengage flange 20 by moving it rearwardly from edge 36, thus bringing the flange 20 into concentricity with the edge 36 as shown in FIGURE 2. When the friction segment is thus located, it is free to undergo limited relative movement in either circumferential direction responsively to the next succeeding brake or clutch operation.

Referring to FIGURES 3, 4 and 5, during brake or clutch operation the friction surfaces 16a are forcibly engaged with the opposing surfaces of rotor 13. The friction segments 10a can move circumferentially by sliding at surfaces 18a. This slidable movement is opposed by one or the other of bar springs 30a as well as the frictional resistance encountered at surfaces 18a. The limitations of this relative movement of the friction segments on the carrier 12a is established by the dimension of opening 52. Thus, when the fastener portion (which is passed through the opening 52) moves into engagement with the edge of opening 52, this will limit any further movement of the friction elements on the carrier. When the brake is released, the springs 30a move the fastener away from the sides of the opening so that there is reestablished a clearance between the fastener and the side of the opening which will again permit floatable movement of the friction segments during the next succeeding brake or clutch operation.

In this embodiment, as in the previous embodiment, the resistance to floatable movement of the friction segments is determined, in part, by the normal applying force developed during brake or clutch operation. In other words, the resistance to sliding movement encountered at surface 18a is determined by the coefficient of friction between surface 18a and the engageable surface of carrier 12a and the normal force of application between the friction segment 10a and the rotor 13. As a result, floatable movement of the friction elements is automatically proportioned to the conditions encountered during braking or clutching operation.

It will be understood from a consideration of the foregoing description, that the two selected embodiments are merely illustrative of the invention and are not to be interpreted as restrictive thereof. Numerous revisions and adaptations can be reasonably expected from those skilled in the art, and it is intended that such revisions and variations as incorporate the herein disclosed principles will be included within the scope of the following claims.

I claim:

1. In a friction producing device and the like wherein first and second members have respective first and second opposing surfaces the first of which moves parallel to and in a first or forward direction relative to the second surface: clip means on said second surface having forwardly and rearwardly positioned flange portions that extend first outwardly from said surface toward said first surface and then toward each other, a friction producing member carried on said second member and slidable on said surface forwardly and rearwardly between said flange portions of said clip means, said friction producing member having flange portions which respectively project forwardly and rearwardly beneath respective forwardly and rearwardly extending flange portions of said clip means to loosely retain said friction member, at least one of the slidably abutting surfaces of said friction member and second surface being a friction material, and spring means to yieldingly center said friction producing member between said flange portions of said clip means and normally provide predetermined clearance therewith.

2. In a friction producing device and the like wherein first and second members have respective first and second opposing surfaces the first of which moves parallel to and in a first or forward direction relative to the second surface: clip means having forwardly and rearwardly positioned flange portions that extend first outwardly from said second surface and then toward each other, a friction producing member positioned between said flange portions of said clip means, said friction producing member having flange portions which respectively project forwardly and rearwardly beneath respective forwardly and rearwardly extending flange portions of said clip means, and a pair of bar springs respective ones of which engage the forwardly and rearwardly positioned surfaces of said friction producing member, said bar springs being positioned between the overlying flange portions of said clip means and friction producing member to prevent outward movement of said friction producing member from said second surface of said second member.

3. In a friction producing device and the like wherein first and second members have respective first and second opposing surfaces the first of which moves parallel to and in a first or forward direction relative to the second surface: clip means having forwardly and rearwardly positioned flange portions that extend first outwardly from said second surface and then toward each other, a friction producing member positioned between said flange portions of said clip means, said friction producing member having flange portions which respectively project forwardly and rearwardly beneath respective forwardly and rearwardly extending flange portions of said clip means, and a pair of bar springs respective ones of which engage the forwardly and rearwardly positioned surfaces of said friction producing member to yieldingly center said friction producing member between said flange portions of said clip means and provide predetermined clearance therewith, said bar springs being positioned between the overlying flange portions of said clip means and friction producing member to prevent outward movement of said friction producing member from said second surface of said second member.

4. In a friction producing device and the like wherein first and second members have respective first and second opposing surfaces the first of which moves parallel to and in a first or forward direction relative to the second surface: a friction producing element having one face positioned against said second surface, an annular ring extending around the side surfaces of said friction producing element, said ring having a first flange portion positioned against said second surface of said second member, a clamping ring on said second member positioned around said annular ring and providing clearance therewith, said clamping ring having a second flange portion spaced toward said first member from said first flange portion and which generally overlies said first flange portion of said annular ring, and a pair of bar springs the ends of which are held by said clamping ring and the center portions of which respectively engage the forwardly and rearwardly positioned surfaces of said annular ring, said bar springs being positioned between said overlying flange portions of said annular and clamping rings to hold said friction producing element against said second surface of said second member.

5. In a friction producing device and the like: a support member having opposite generally flat side surfaces with an opening therebetween, a friction producing element having friction surfaces which slidingly engages the opposite sides of said support member and having a connecting portion extending through said opening, said connecting portion having generally predetermined clearance with respect to the surfaces of said opening to permit movement of said friction element in a first or forward direction relative to said support member, and spring means urging said friction member in a direction opposite to said forward direction, and at least one of said slidingly engaged surfaces of said support and friction members being a friction material.

6. In a friction producing device and the like: a support member having first and second generally oppositely facing flat side surfaces with an opening therebetween, first and second cup shaped members slidably positioned against said first and second side surfaces respectively, said first cup shaped member having a female annular boss which projects into said opening, said boss having generally conically shaped inside female surfaces whose small diameter end opens into the end of said annular boss, said second cup shaped member having a male annular boss whose outside surfaces are adapted to be received by said female boss of said first cup shaped member, and a frusto conical wedge positioned in said female boss with its side surfaces spaced apart generally parallelly with respect to said female surfaces of said female boss, the sidewalls of said male annular boss being wedged between the conical side surfaces of said frusto conical wedge and female boss to lock said first and second cup shaped members to said support member, and there being a friction producing material positioned between said engaging surfaces of said support member and said first and second cup shaped members.

7. In a friction producing device: first and second members having generally smooth opposing surfaces adapted to be moved generally parallel relative to each other, said second member moving in a first direction relative to said first member, a friction producing element having opposite faces each of which is made of friction producing materials, means loosely attaching said friction producing element to the opposing surface of said first member with one of its friction producing surfaces adapted to abut said smooth surface of said first member and in a manner wherein normal compressive forces between said members is transmitted from said friction producing element to said first member at least in part by compression of its friction producing surface against said generally smooth surface of said first member, said means including resilient structure for opposing movement of said friction producing element in said first direction relative to said first member.

8. In a friction producing device: first and second members having generally smooth opposing surfaces adapted to be moved generally parallel relative to each other, said second member moving in a first direction relative to said first member, a friction producing element having opposite faces each of which is made of friction producing materials, means loosely attaching said friction producing element to the opposing surface of said first member with one of its friction producing surfaces adapted to abut said smooth surface of said first member and in a manner wherein normal compressive forces between said members is transmitted from said friction producing element to said first member at least in part by compression of its friction producing surface against said generally smooth surface of said first member, said means including a spring for restraining movement of said friction producing element in said first direction relative to said first member.

9. In a friction producing device and the like wherein first and second members have respective first and second opposing surfaces the first of which moves parallel to and in a first or forward direction relative to the second surface: a friction member slidably carried on and abutting said second surface of said second member, said friction member having a normal position on said second surface and being slidable in a forward direction on said second surface from said normal position, spring means yieldably urging said friction member into its normal position on said second surface, and there being a sufficient coefficient of friction between said second surface and said friction member to damp out chatter produced between said first surface and said friction member.

10. In a friction producing device and the like wherein first and second members have respective first and second opposing surfaces the first of which moves parallel to and in a first or forward direction relative to the second surface: a friction member slidably carried on and abutting said second surface of said second member, said friction member having a normal position on said second surface and being slidable in said first and opposite direction on said second surface from said normal position, spring means yieldably urging said friction member into its normal position on said second surface, and there being a sufficient coefficient of friction between said second surface and said friction member to damp out chatter produced between said first surface and said friction member.

11. In a friction producing device and the like wherein first and second members have respective first and second opposing surfaces the first of which moves parallel to and in a first or forward direction relative to the second surface: a friction member slidably carried on and abutting said second surface of said second member, said friction member having a normal position on said second surface and being slidable in a forward direction on said second surface from said normal position, spring means yieldably urging said friction member into its normal position on said second surface, and at least one of the slidably abutting surfaces of said friction member and second surface being a friction material.

12. A friction producing device and the like for rubbing contact with an opposing surface and comprising: a support member having a generally flat surface thereon, a friction lining segment having a surface of friction producing material slidably positioned on said flat surface for rubbing movement in first and opposite directions over said surface, and spring means yieldably opposing sliding movement of said segment in said first direction relative to said support member.

13. A friction producing device and the like for rubbing contact with an opposing surface and comprising: a support member having a generally flat surface thereon, a friction lining segment slidably positioned on said flat surface, clip means fastened to said support member with portions on opposite sides of said lining segment, said opposite portions of said clip means forming flanges which extend generally toward each other and are spaced from said support member, said lining segment having flange portions thereon which project between said flange portions of said clip means and said support member, and spring means positioned between said flange portions of said segment and clip means to lock said segment onto said support while also yieldably centering said segment between said opposite portions of said clip means.

References Cited in the file of this patent

UNITED STATES PATENTS

| | | |
|---|---|---|
| 1,977,368 | Wood | Oct. 16, 1934 |
| 2,190,767 | Benson | Feb. 20, 1940 |
| 2,806,570 | Markus | Sept. 17, 1957 |